(12) United States Patent
McAlister et al.

(10) Patent No.: US 8,767,245 B2
(45) Date of Patent: Jul. 1, 2014

(54) WORKFLOW MANAGEMENT INTERFACE

(75) Inventors: Johnathon L. McAlister, Fort Lupton, CO (US); Jason R. Nielsen, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 104 days.

(21) Appl. No.: 13/588,278

(22) Filed: Aug. 17, 2012

(65) Prior Publication Data
US 2014/0049794 A1 Feb. 20, 2014

(51) Int. Cl.
*G06F 3/00* (2006.01)
*G06K 15/00* (2006.01)

(52) U.S. Cl.
USPC .................. 358/1.15; 358/1.12; 358/2.1

(58) Field of Classification Search
CPC .......... G06F 17/30; G06F 11/00; G06F 3/00; H04L 67/14
USPC ......................... 358/1.12, 1.15, 2.1
See application file for complete search history.

(56) References Cited

U.S. PATENT DOCUMENTS

| | | | |
|---|---|---|---|
| 6,728,947 B1* | 4/2004 | Bengston | 717/103 |
| 7,698,650 B2 | 4/2010 | Holmes | |
| 7,847,956 B2 | 12/2010 | Farrell et al. | |
| 7,899,902 B2 | 3/2011 | Hyotani et al. | |
| 7,979,478 B2* | 7/2011 | Hiraiwa et al. | 707/821 |
| 2003/0030664 A1 | 2/2003 | Parry | |
| 2007/0113164 A1 | 5/2007 | Hansen et al. | |
| 2008/0071728 A1* | 3/2008 | Lim | 707/1 |
| 2011/0078110 A1* | 3/2011 | Joseph | 707/610 |
| 2011/0231459 A1* | 9/2011 | Hiraiwa et al. | 707/828 |
| 2012/0017261 A1* | 1/2012 | Lim | 726/1 |
| 2013/0081017 A1* | 3/2013 | Bhattiprolu et al. | 718/100 |

* cited by examiner

*Primary Examiner* — Jerome Grant, II
(74) *Attorney, Agent, or Firm* — Blakely, Sokoloff, Taylor & Zafman LLP

(57) ABSTRACT

A method is disclosed. The method includes configuring one or more sets of rules within an input device to route print jobs to a plurality of workflows, receiving a print job at an input device, matching the print job with a first of a plurality of workflows based on a set of rules associated with the first workflow and routing the print job to the first workflow.

9 Claims, 5 Drawing Sheets

Figure 4

WORKFLOW MANAGEMENT INTERFACE

FIELD OF THE INVENTION

The invention relates to the field of computer systems, and in particular, to printing software products.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer.

Once a connection is established between a workstation and the printer, printing software is implemented at a print server to manage a print job from job entry and management through the complete printing process. In high speed print production systems, printing software may manage workflows including hundreds (or thousands) of print jobs. In such applications, received print jobs are routed to one of various workflows. However, typical workflow systems include cumbersome routing processes that are difficult to manage. For instance, redundant program and configuration is often implemented to map each particularly job type that is received to a workflow.

Accordingly, an improved routing mechanism is desired.

SUMMARY

In one embodiment, a method is disclosed. The method includes configuring one or more sets of rules within an input device to route print jobs to a plurality of workflows, receiving a print job at an input device, matching the print job with a first of a plurality of workflows based on a set of rules associated with the first workflow and routing the print job to the first workflow.

Another embodiment discloses a print server that includes a printing software product having a graphical user interface (GUI) to enable configuration of a set of rules to route print jobs to a plurality of workflows, a plurality of workflows to which print jobs received at the print server are routed for processing and an input device to match each print job with a one of a plurality of workflows based on a set of rules associated with each workflow and route the print jobs to the respective workflows.

BRIEF DESCRIPTION OF THE DRAWINGS

A better understanding of the present invention can be obtained from the following detailed description in conjunction with the following drawings, in which:

FIG. 4 is a screen shot illustrating one embodiment of a graphical user interface in a printing software product for setting up mappings between sets of rules and the workflow to which each set of rules is tied.

DETAILED DESCRIPTION

A workflow management mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
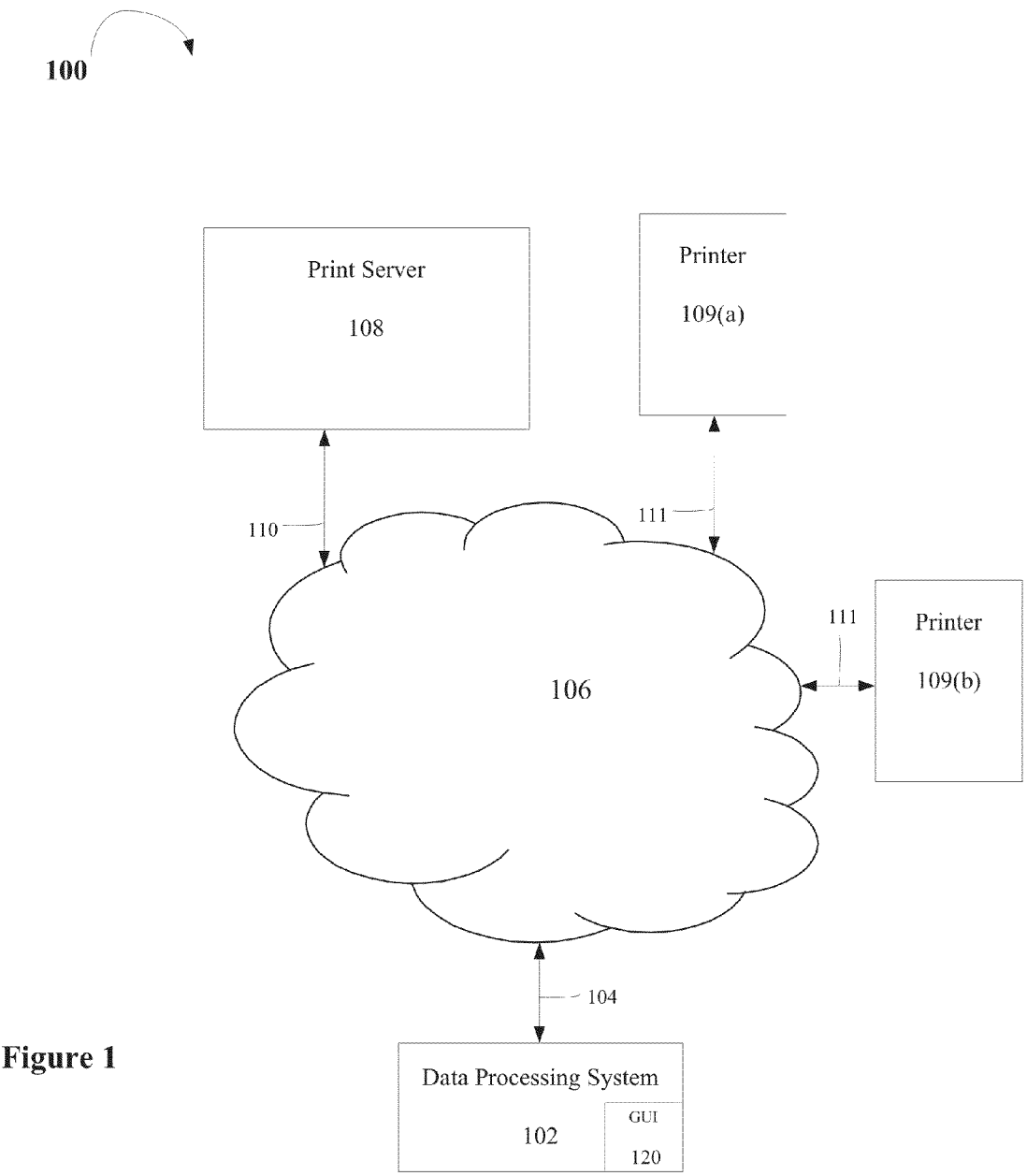
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to one of printers 109 for printing, which are coupled to network 106 via communications links 111.

In one embodiment, the operating system on data processing system 102 allows a user to select the desired print server 108 and submit requests for service requests to printer 109 via print server 108 over network 106. In a further embodiment, print server 108 includes a print queue for print jobs requested by remote data processing systems.

Although described as separate entities, other embodiments may include print server 108 being incorporated in one or more of the printers 109. However in other embodiments, print server 108 and printer 109 may be physically separate entities. Therefore, the data processing system network depicted in FIG. 1 is selected for the purposes of explaining and illustrating the present invention and is not intended to imply architectural limitations. Those skilled in the art will recognize that various additional components may be utilized in conjunction with the present invention.

According to one embodiment, print server 108 implements a printing software product that manages the printing of documents from data processing system 102 between data processing system 102 and one or more of printers 109. In other embodiments, the printing software manages printing of documents from multiple data processing systems 102 to the one or more printers 109.

According to one embodiment, the printing software product may be implemented using InfoPrint ProcessDirector (IPPD), although other types of printing software may be used instead. In a further embodiment, data processing system 102 includes a print application that interacts with the printing software product at printer server 108 to provide for efficient transmission of print jobs.

In one embodiment, the printing software product includes a graphical user interface (GUI) 120 that enables a system administrator (or operator) to interact with the print application. In a further embodiment, an operator at data processing system 102 implements GUI 120 to automatically submit print jobs to the printing software product at printer server 108.

In yet a further embodiment, GUI 120 enables an operator to configure routing destinations for workflow management. In this embodiment, the printing software product includes one or more input devices that examine filenames and other metadata of received print jobs to determine the workflow which each print job is to be forwarded. Thus, each input device includes lookup rules and routing destinations to perform workflow management.

Figure 2:
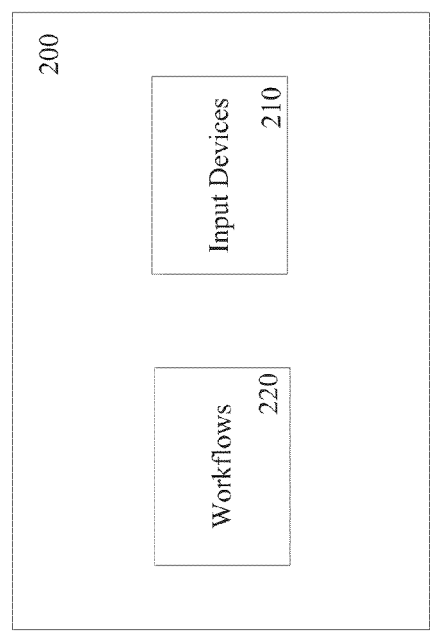
FIG. 2 illustrates one embodiment of a printing software product.

FIG. 2 illustrates one embodiment of components of a printing software product 200, including input devices 210 and workflow 220. According to one embodiment, each input device 210 includes a configuration table that sets rules to route specific types of print jobs to multiple workflows 220, and a workflow step having a configuration view that enables routing to multiple workflows 220 based on a set of rules for each workflow. In such an embodiment, an input device incorporates filename pattern matching to retrieve a file. Input devices may also use attributes from the contents of meta-data files (such as a JCL file), which are received along with a print data file. Such meta-data job attributes may also be used in the rules matching logic, and thus also in the configuration of the rules.

Additionally, the input device 210 allows for job properties pattern matching to determine which workflow is subsequently launched to process the file. As a result, a single input device 210 has the ability to route various kinds of documents to different job type workflows based on the values of various properties intrinsic to the job (e.g., job name, size, etc.). In a further embodiment, multiple input devices 210 may share a common folder, enabling the input devices to pull in only those documents that match their rules, and leaving the other files to be pulled in by other input devices.

According to one embodiment, an input device 210 includes an additional step that routes to multiple workflows based on values of various additional non-intrinsic properties once a job has been examined and processed by steps in a workflow. In one embodiment, non-intrinsic properties are those that may be pulled from the contents of the files, and not properties of the files themselves (e.g., properties that require reading the contents of the document to obtain a value. Exemplary properties include: account number, account owner, address, account balance, account open date, date of last transaction, etc.

Figure 3A:
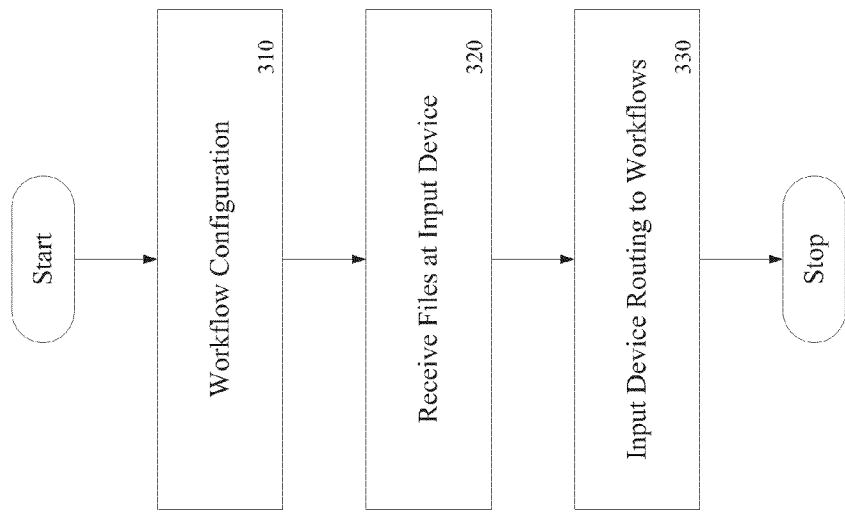
FIG. 3A is a flow diagram illustrating one embodiment of a workflow process performed by a printing software product.

FIG. 3A is a flow diagram illustrating one embodiment of a workflow process. At processing block 310, input device 210 and workflow 220 configuration is performed via GUI 120. In one embodiment, an operator configures the routing rules for the device, as well as the workflow steps. In a further embodiment, the workflow steps include a step to transfer between workflows. At processing block 320, print jobs are received at input device 210. At processing block 330, input device 210 processes each received job according to the defined workflow configuration.

Figure 3B:
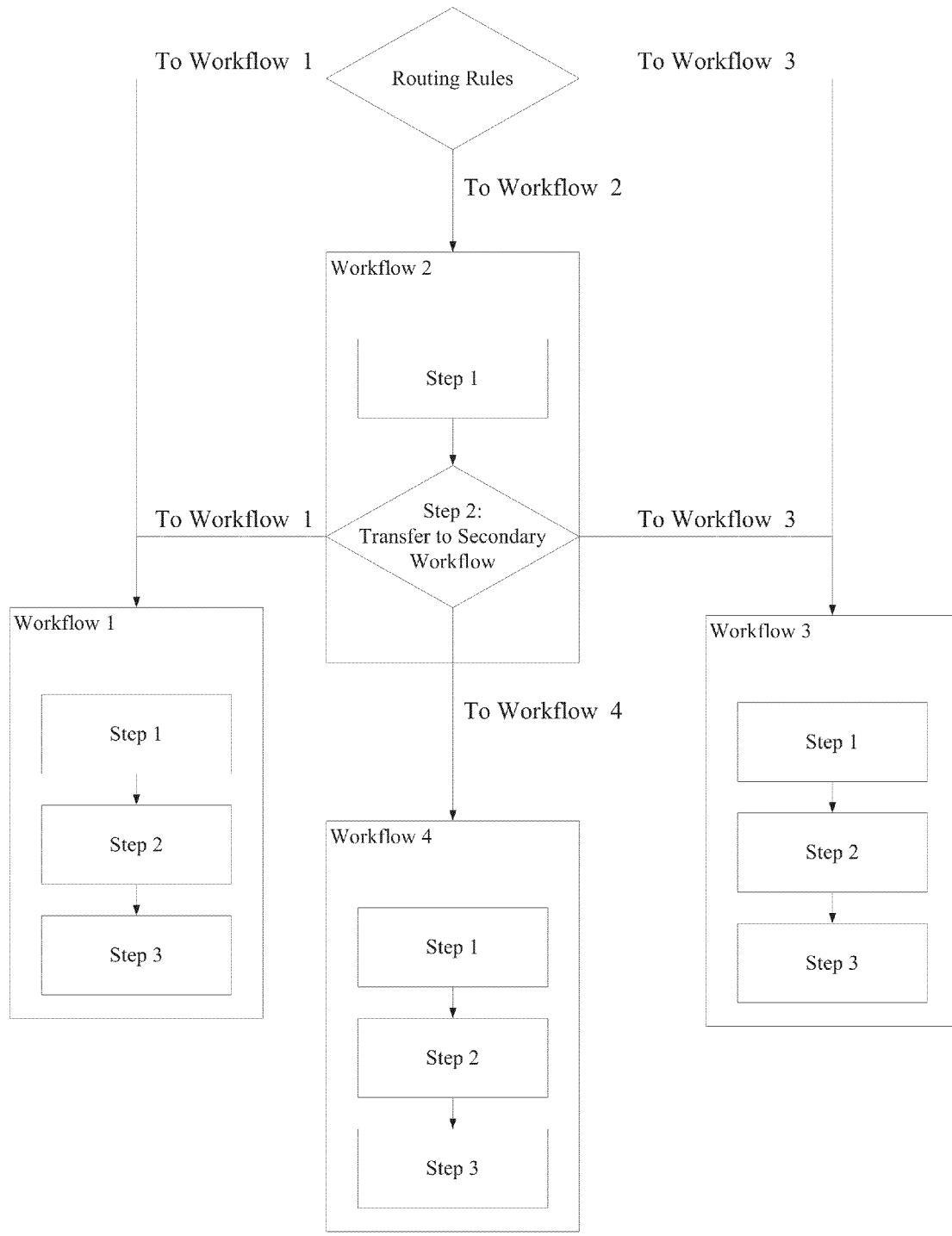
FIG. 3B is a flow diagram illustrating one embodiment of a workflow mapping.

FIG. 3B is a flow diagram illustrating one embodiment of a workflow mapping defined by workflow configuration performed in processing block 310. In such an embodiment, the input device has the following mappings for received jobs:
1. Route job to Workflow 1 if Rule 1 and Rule 2 are true;
2. Route job to Workflow 2 if Rule 1 and Rule 3 are true; and
3. Route job to Workflow 3 if Rule 4 and Rule 5 are true.

A step in Workflow 2 may have the following mappings to transfer jobs to secondary workflows:
1. Transfer job to Workflow 1 if Rule 6 and Rule 7 are true;
2. Transfer job to Workflow 3 if Rule 8 and Rule 9 are true; and
3. Transfer job to Workflow 4 if Rule 10 is true.

Figure 4:
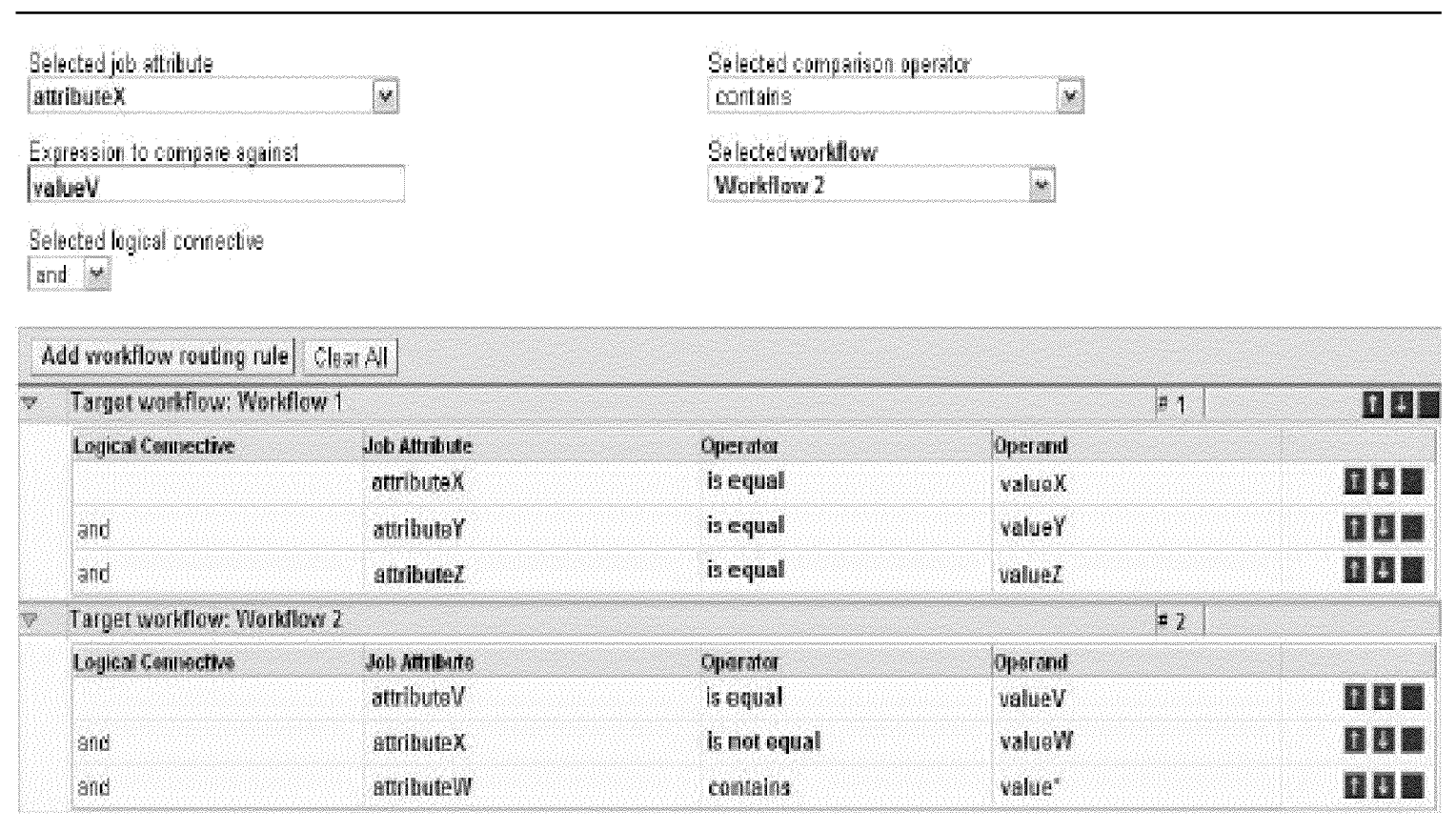

FIG. 4 is a screen shot illustrating one embodiment of a component of a printing software product graphical user interface 120 for configuring a set of rules to transfer a job from an existing workflow to a new workflow during the configuration process.

Figure 5:
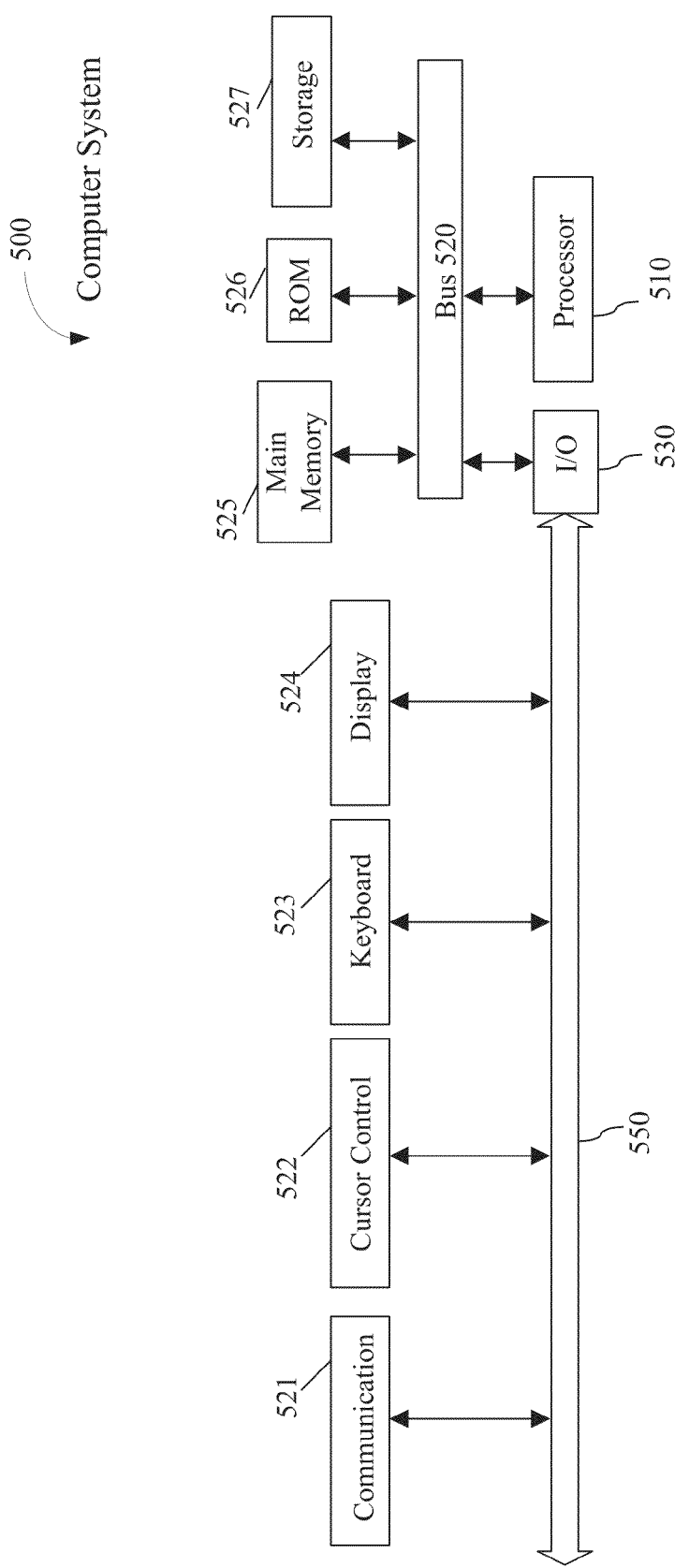
FIG. 5 illustrates one embodiment of a computer system.

FIG. 5 illustrates a computer system 500 on which data processing system 102 and/or server 108 may be implemented. Computer system 500 includes a system bus 520 for communicating information, and a processor 510 coupled to bus 520 for processing information.

Computer system 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Computer system 500 also may include a read only memory (ROM) and or other static storage device 526 coupled to bus 520 for storing static information and instructions used by processor 510.

A data storage device 525 such as a magnetic disk or optical disc and its corresponding drive may also be coupled to computer system 500 for storing information and instructions. Computer system 500 can also be coupled to a second I/O bus 550 via an I/O interface 530. A plurality of I/O devices may be coupled to I/O bus 550, including a display device 524, an input device (e.g., an alphanumeric input device 523 and or a cursor control device 522). The communication device 521 is for accessing other computers (servers or clients). The communication device 521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory article of manufacture comprising a machine-readable medium including data that, when accessed by a machine, cause the machine to perform operations comprising:
    configuring one or more sets of rules within an input device to route print jobs to a plurality of workflows;
    receiving a print job at the input device;
    matching the print job with a first of a plurality of workflows based on a set of rules associated with the first workflow, where the rules can include any combination of filename pattern matching and matching of job attributes derived from meta-data files that may accompany print jobs; and
    routing the print job to the first workflow.

2. The article of manufacture of claim 1 wherein the rules are configured using a graphical user interface (GUI).

3. The article of manufacture of claim 1 comprising the machine-readable medium including data that, when accessed by a machine, cause the machine to further perform operations comprising:
    receiving a second print job at the input device;
    matching the second print job with a second of a plurality of workflows based on a set of rules associated with the second workflow; and
    routing the print job to the second workflow.

4. The article of manufacture of claim 3 comprising the machine-readable medium including data that, when accessed by a machine, cause the machine to further perform operations comprising transferring the second print job from the second workflow to the first workflow.

5. The article of manufacture of claim 1 wherein the input device performs job properties pattern matching to match print jobs with a workflow.

6. A print server, comprising a printing software product having:
    a graphical user interface (GUI) to enable configuration of a set of rules to route print jobs to a plurality of workflows;
    a plurality of workflows to which print jobs received at the print server are routed for processing; and
    an input device to match each print job with one of the plurality of workflows based on a set of rules associated with each workflow and route the print jobs to the respective workflows and to perform rules matching to assign print jobs to a workflow, where the rules can include any combination of filename pattern matching and matching of job attributes derived from meta-data files that may accompany print jobs.

7. The print server of claim 6 wherein the input device comprises a configuration table to set rules to route specific types of print jobs to the plurality of workflows.

8. A computer system comprising:
    a memory to store a printing software product, including:
        a plurality of workflows to which print jobs received at the print server are routed for processing; and
        an input device to match each print job with one of the plurality of workflows based on a set of rules associated with each workflow and route the print jobs to the respective workflows, wherein the input device performs rules matching in order to assign print jobs to a workflow, where the rules can include any combination of filename pattern matching and matching job attributes derived from meta-data files that may accompany print jobs;
    a processor, coupled to the memory, to execute the printing software product; and
    a display device to display a graphical user interface (GUI) for the printing software product to enable configuration of a set of rules to route print jobs to a plurality of workflows.

9. The computer system of claim 8 wherein the input device comprises a configuration table to set rules to route specific types of print jobs to the plurality of workflows.

* * * * *